United States Patent [19]

Teramachi

[11] 4,391,473
[45] Jul. 5, 1983

[54] LINEAR BEARING UNIT

[76] Inventor: Hiroshi Teramachi, 34-8, Higashi-Tamagawa 2-chome, Setagaya-ku, Tokyo, Japan, 158

[21] Appl. No.: 310,662

[22] Filed: Oct. 13, 1981

[51] Int. Cl.³ ............................................. F16C 29/06
[52] U.S. Cl. .................................................... 308/6 C
[58] Field of Search ............. 308/6 C, 6 R, 6 A, 3 A, 308/3.5

[56] References Cited

U.S. PATENT DOCUMENTS

| | | | |
|---|---|---|---|
| 3,476,445 | 11/1969 | Carlson | 308/6 C |
| 4,030,191 | 6/1977 | Ernst et al. | 308/6 C |
| 4,118,101 | 10/1978 | Teramachi | 308/6 C |
| 4,294,100 | 10/1981 | Olschewski et al. | 308/6 C |

Primary Examiner—Lenard A. Footland
Attorney, Agent, or Firm—George B. Oujevolk

[57] ABSTRACT

An improved linear bearing unit is disclosed which has no reduction in operative performance irrespective of elimination of a conventional retainer. The bearing case of the linear bearing unit contains a plurality of non-loading ball holes and semi-circular deep track grooves whereby an increased contact surface is achieved between the loading balls and track grooves. The upper track grooves involve a right angle therebetween relative to the center of the bearing unit, causing no edge load (referred to as critical load at edge portion) to occur. Further, prestress (or preload) may be applied to loading balls in some of four track grooves.

According to another aspect of the invention an outer sleeve is fitted into the bearing case, which contains four track grooves on the inner wall thereof. Side covers (or return plates) firmly secured to both end faces of the bearing case contain annular grooves corresponding to annular projections on both the end faces of the outer sleeve, U-shaped concave portions in alignment with four track grooves thereon which serve for reversing the movement of the loading balls and tongue portions at the innermost end of the side covers.

8 Claims, 22 Drawing Figures

FIG. 9(A)
FIG. 9(B)
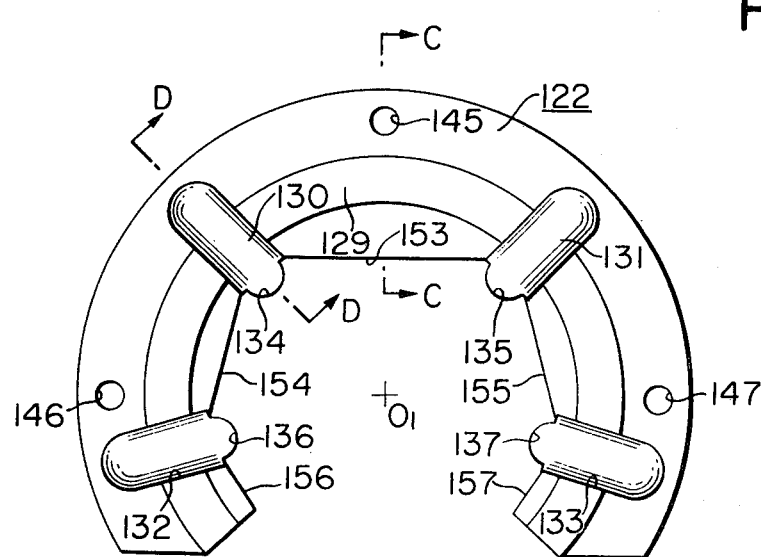
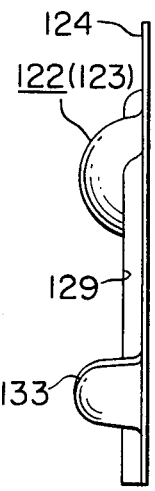
FIG. 9(C)
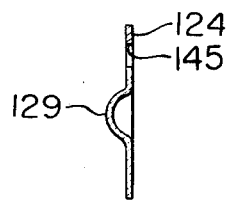

LINEAR BEARING UNIT

FIELD OF THE INVENTION

The present invention relates to an improved linear bearing unit. According to the first aspect of the present invention the linear bearing unit essentially comprises a bearing case and a track table, wherein said bearing case adapted to move forwards and backwards carrying a slide surface at a table side of an industrial machine or the like contains a plurality of non-loading ball holes and track grooves, the latter being provided on a cylindrical inner recess of the bearing case, while said track table inserted through the bearing case is formed with a plurality of track grooves corresponding to said track grooves on the inner recess of the bearing case. Further, according to the second aspect of the present invention the linear bearing unit essentially comprises a bearing case, an outer sleeve firmly fitted into said bearing case with the aid of a key and a track table inserted through said outer sleeve, wherein said bearing case contains a plurality of U-shaped non-loading ball grooves radially recessed on the cylindrical inner recess and said outer sleeve contains a plurality of track grooves formed on the inner wall, while said track table contains a plurality of track grooves corresponding to said track grooves on the outer sleeve.

BACKGROUND OF THE INVENTION

As is well known, a widely used conventional linear bearing is of ball bush type. This type of linear bearing can carry a vertical load satisfactorily, but when a moment load or upward is applied thereon, it functions only by a fraction of vertical load carrying capability.

To obviate the drawback with the conventional linear bearing as described above, the inventors developed a linear bearing with a retainer incorporated therein which contains a plurality of longitudinally extending ball arrangements located in a symmetrical relation and side covers firmly secured to both end faces of the bearing body, said side covers having an U-shaped concave portion located in alignment with said plural ball arrangements so as to reverse the direction of movement of the loading balls.

However, it is found that the newly developed linear bearing has a bottleneck that it is difficult to manufacture this type of linear bearing at an inexpensive cost, because when it is required to change the length of the bearing body the retainer should be prepared which has its length changed in proportion to the modified bearing body.

SUMMARY OF THE INVENTION

Thus, it is an object of the present invention to provide an improved linear bearing unit which has no reduction in bearing performance irrespective of elimination of a conventional retainer, said linear bearing unit containing a plurality of non-loading ball holes in a bearing case and a plurality of semi-circular deep track grooves on the inner wall thereof whereby an increased contact area is ensured between the loading balls and track grooves, wherein the upper track grooves involves a right angle therebetween relative to the center of the bearing unit, resulting in no edge load (referred to as critical load at edge portion) caused in the track grooves and moreover prestress (or preload) is adapted to be applied to loading balls in some of four track grooves.

Further, it is other object of the present invention to provided a linear bearing unit which contains an outer sleeve fitted into a bearing case, said outer sleeve having four track grooves formed on the inner wall thereof, wherein side covers (or return plates) firmly secured to both end faces of the bearing case contains annular grooves corresponding to annular projections on both the end faces of the outer sleeve, U-shaped concave portions radially extending in alignment with the four track grooves of the outer sleeve and tongue portions at the innermost end of the side covers.

It is another object of the present invention to provide a linear bearing unit which has an increased contact surface to ensure a predetermined contact angle and is adapted to apply preload (prestress) without difficulty, wherein the bearing case made of rectangular section has a cylindrical inner recess on which four U-shaped non-loading ball grooves are provided in parallel to one another in the longitudinal direction at a predetermined angular distance on a certain circle, while semi-circular track grooves are deeply recessed on the outer sleeve as well as a track table, whereby an increased contact area is achieved without any necessity for a conventional retainer irrespective of any error in arrangement (indexing) of the track grooves on the outer sleeve or any error in arrangement of the track grooves on the track table.

In order to accomplish the above-described objects of the present invention there is proposed in accordance with the first aspect of the present invention a linear bearing unit essentially comprising a bearing case having a lower open end and four non-loading ball holes having the substantially same inner diameter as the ball diameter, side covers firmly secured to both end faces of said bearing case, a track table inserted through a cylindrical inner recess of the bearing case and a number of balls arranged in line one after another through four longitudinally extending circular hollow space between semi-conductor concave track grooves on the cylindrical inner recess of the bearing case and another corresponding semi-circular concave track grooves on the track table as well as through the four non-loading ball holes in the bearing case, said longitudinally extending circular hollow spaces being in communication with the non-loading balls holes via U-shaped concave portions formed on both the sides covers, wherein the bearing case has annular projections at both the end faces thereof which are located between the non-loading ball holes and the concave track grooves on the cylindrical inner recess and further it has a longitudinally extending deep slit at one side thereof so as to prestress or preload some of the concave track grooves on the cylindrical inner recess, while the side covers contain annular grooves corresponding to said annular projections, U-shaped concave portions and ball guide tongue portions in communication with the longitudinally extending circular hollow space at the innermost end of said U-shaped concave portions.

Further, there is proposed in accordance with the second aspect of the present invention a linear bearing unit essentially comprising a bearing case having a lower open end, four non-loading ball grooves having the substantially same width as the ball diameter and a key groove located as the central part thereof, side covers firmly secured to both end faces of said bearing case, an outer sleeve having four loading ball concave track grooves on a cylindrical inner recess and a key groove on the outer surface thereof corresponding to said key groove in the bearing case, a track table inserted through the cylindrical inner recess of said outer sleeve, a key received in said key grooves and a number of loading balls arranged in line one after another through the four longitudinally extending hollow spaces between semi-circular concave track grooves on the cylindrical inner recess of the outer sleeve and another semi-circular concave track grooves on the track table as well as through the four non-loading ball grooves on the inner wall of the bearing case, said longitudinally extending hollow space being in communication with said non-loading ball grooves via U-shaped concave portions formed on both the side covers, wherein the outer sleeve has annular projections at both the end faces thereof which are located midst the non-loading ball grooves and the concave track grooves on the cylindrical inner recess and further the bearing case has a longitudinally extending inclined deep slit at one side thereof so as to prestress or preload some of the concave track grooves on the cylindrical inner recess, while the side covers contain annular grooves corresponding to said annular projections, U-shaped concave portions and ball guide tongue portions in communication with the longitudinally extending hollow space at the innermost end of said V-shaped concave portions.

BRIEF DESCRIPTION OF THE ACCOMPANYING DRAWINGS

FIG. 9(B) is a side view of the side cover; and FIG. 9(C) is a partial sectional side view of the side cover.

FIG. 9(A') is another front view of a side cover.

DETAILED DESCRIPTION OF THE INVENTION

Figure 1:
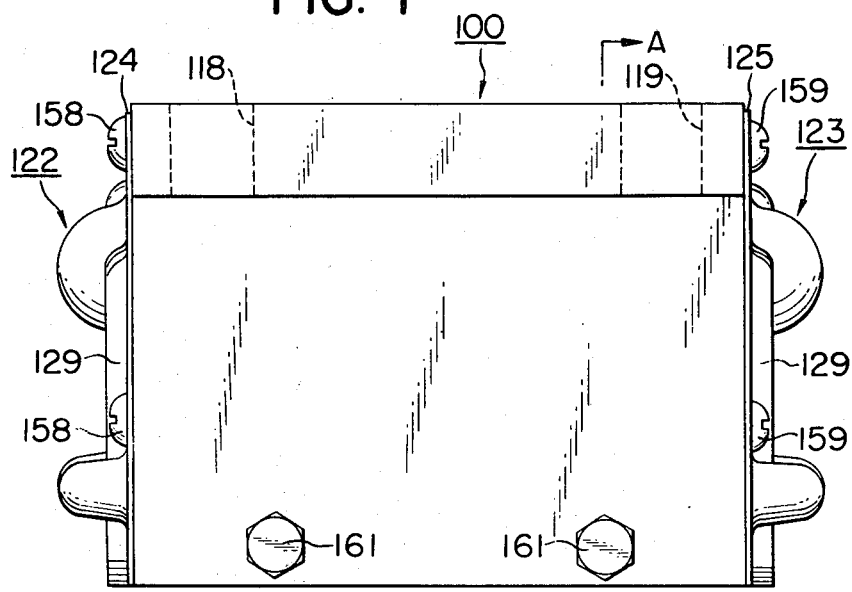
FIG. 1 is a side view of a linear bearing unit in accordance with the present invention.

A bearing case for a linear bearing unit in accordance with the present invention is generally represented by reference numeral 100.

Figure 8:
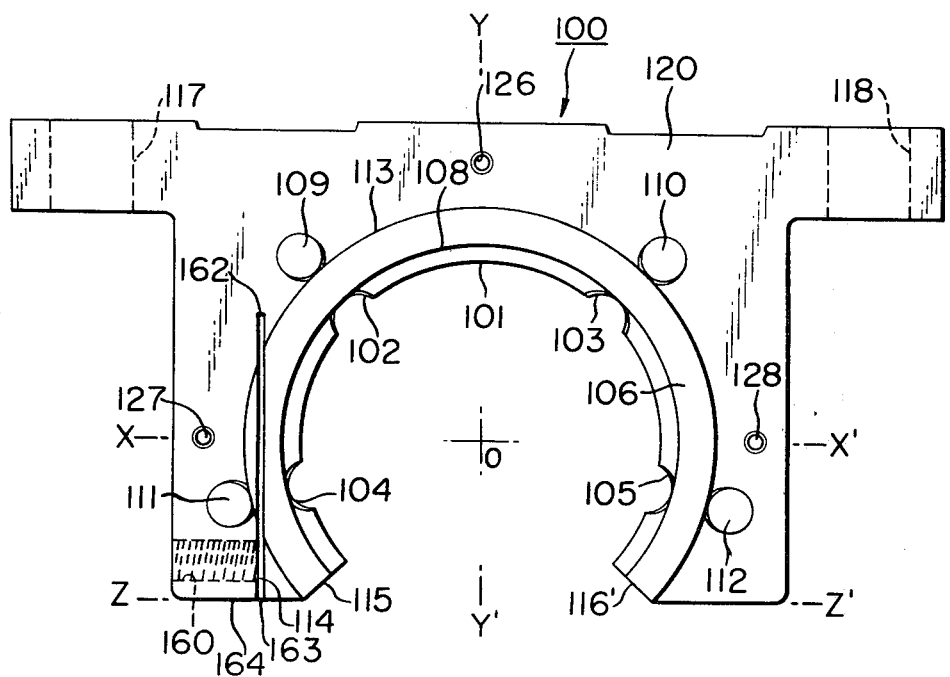
FIG. 8 is a front view of the bearing case.

As illustrated in FIG. 8, the bearing case 100 made of a rectangular shaped steel has a longitudinally extending cylindrical inner recess 101 which contains a plurality of concave grooves 102, 103, 104 and 105 for loading balls extending in parallel to one another in the longitudinal direction, of which radius of curvature is designed to be identical to the outer diameter of the balls.

Among said concave grooves 102 to 105 for guiding the loading balls the upper concave grooves 102 and 103 are symmetrically located at a position angularly offset by 45 degrees relative to a horizontal line X-X' which passes through the center 0 of the bearing case 100, whereas the lower concave grooves 104 and 105 are also symmetrically located at a position angularly offset by 15 degrees relative to the horizontal line X-X'.

Figure 7:
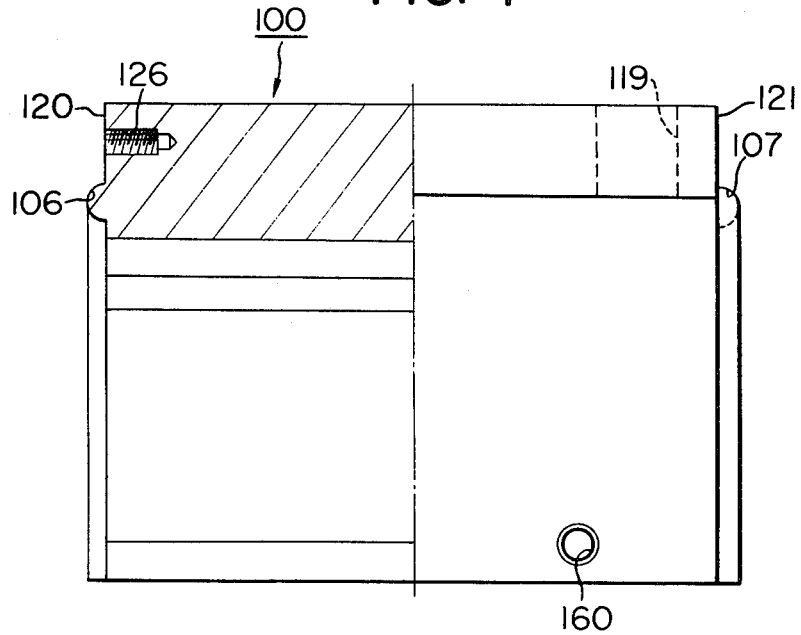
FIG. 7 is a partly sectioned side view of the bearing case.

Reference numerals 106 and 107 in FIG. 7 designate an annular projection as a ball return guide which is raised from both end faces of the bearing case 100. Said annular projections 106 and 107 have an inner circular edge 108 respectively which extends tangent to the bottom of the concave grooves 102 to 105.

Reference numerals 109, 110, 111 and 112 in FIG. 8 designate a non-load ball holes respectively which is located on a circle outside the inner recess 101, having an inner diameter appreciably larger than the outer diameter of the balls. Said non-load ball holes 109 to 112 are located on straight lines which extend from the center 0 through the respective non-load ball holes 102 to 105 and the outer edge 113 of the annular projection extends tangent to the respective innermost walls of the non-load ball holes 109 to 112.

Reference numeral 114 designates a deep slit which is formed into the body of the bearing case 100 with the aid of an electric discharge machine. Said slit 114 is located between the non-load ball hole 111 and the concave groove 104 at a shorter distance to the former, extending in the longitudinal direction, wherein its width should be possibly small and is most preferably about 0.5 mm.

It is to be noted that the slit 114 vertically extends in parallel to the side wall of the bearing case 100 and its upper end 162 is located below the upper non-load hole 109, while its lower end 163 is opened at the bottom wall 164 of the bearing case.

Figure 2:
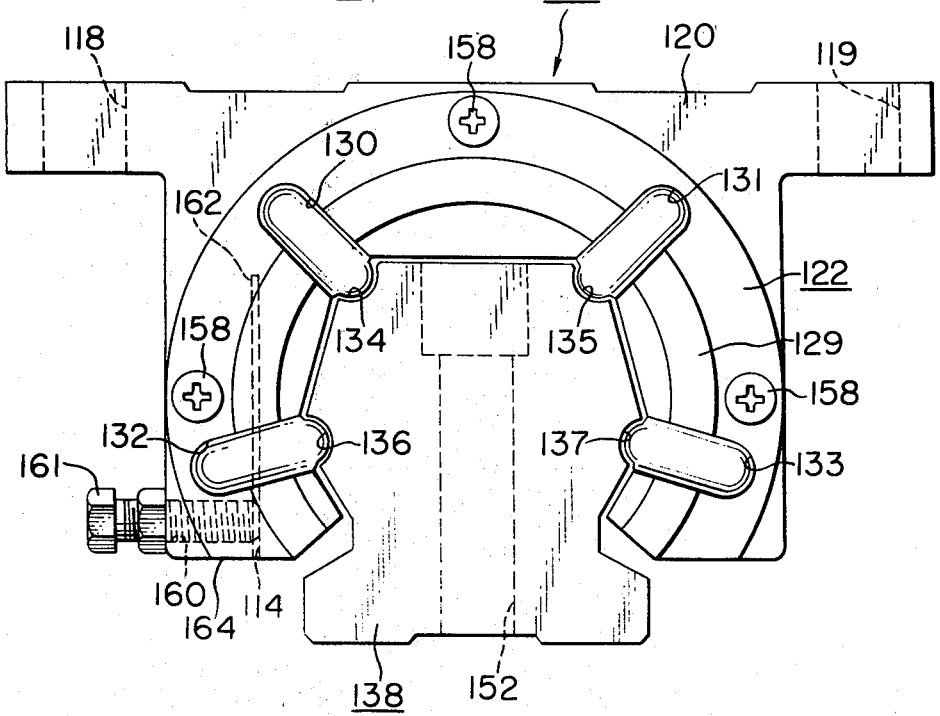
FIG. 2 is a front view of the linear bearing unit in FIG. 1.
Figure 3:
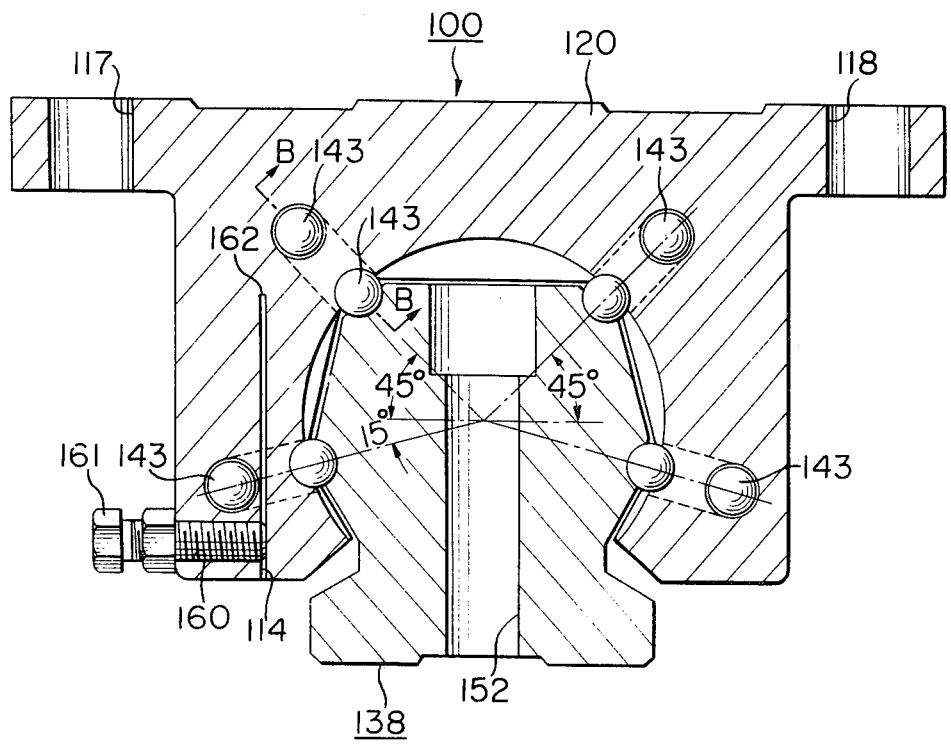
FIG. 3 is a sectional front view of the linear bearing unit taken in line A—A in FIG. 1.

Thus, as illustrated in FIG. 2, the right part of the bearing case 100 relative to the slit 114 is deformed to the right by screwing a hexagonal headed bolt 161 forwards, whereby the concave grooves 102 and 104 are prestressed.

At the lower part of the bearing case 100 inwards of the lower non-load ball holes 111 and 112 are provided open end faces 115 and 116 which have an inclination angle in the range of 40 to 45 degrees relative to the vertical line Y-Y' or horizontal line Z-Z' at the bottom of the bearing case 100, extending in the longitudinal direction.

Further, on both the end faces 120 and 121 of the bearing case 100 are provided threaded holes 126, 127 and 128 which serve for firmly mounting side covers 122 and 123 by tightening screws 159 which are inserted through drilled holes at the flat parts 124 and 125 of the side covers 122 and 123.

Figure 6:
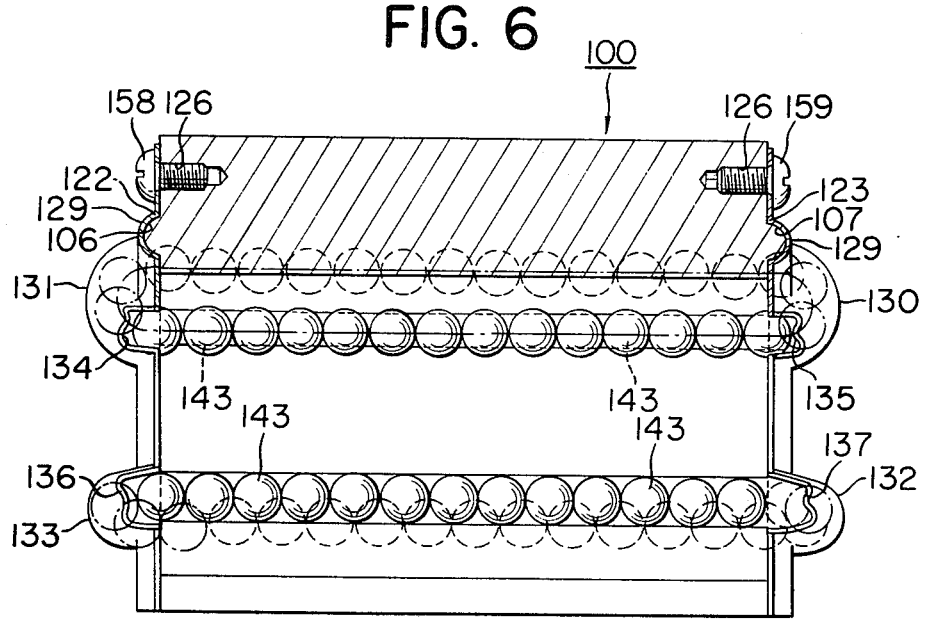
FIG. 6 is a partial sectional side view of the linear bearing unit, shown in an enlarged scale.
Figure 9A:
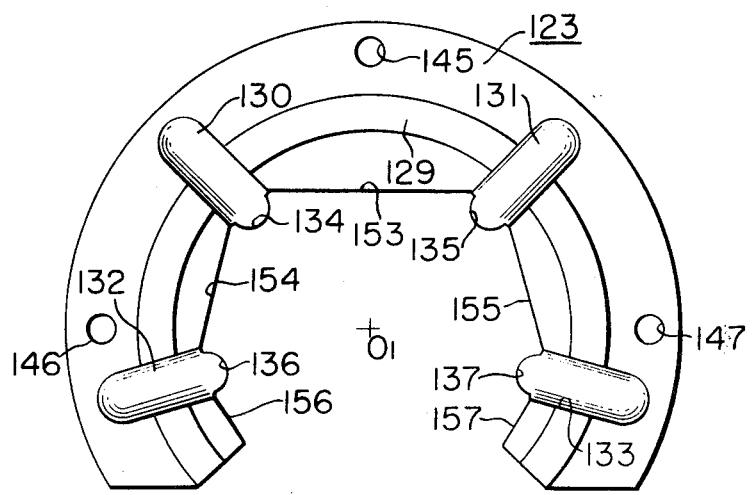
FIG. 9(A) is a front view of a side cover.
Figure 10A:
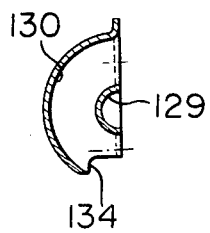
FIG. 10(A) is a sectional side view of an U-shaped portion taken in line D—D in FIG. 9(A)
Figure 10B:
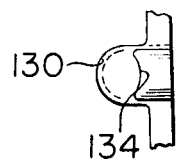
FIG. 10(B) is a bottom view of the U-shaped concave portion.
Figure 11:
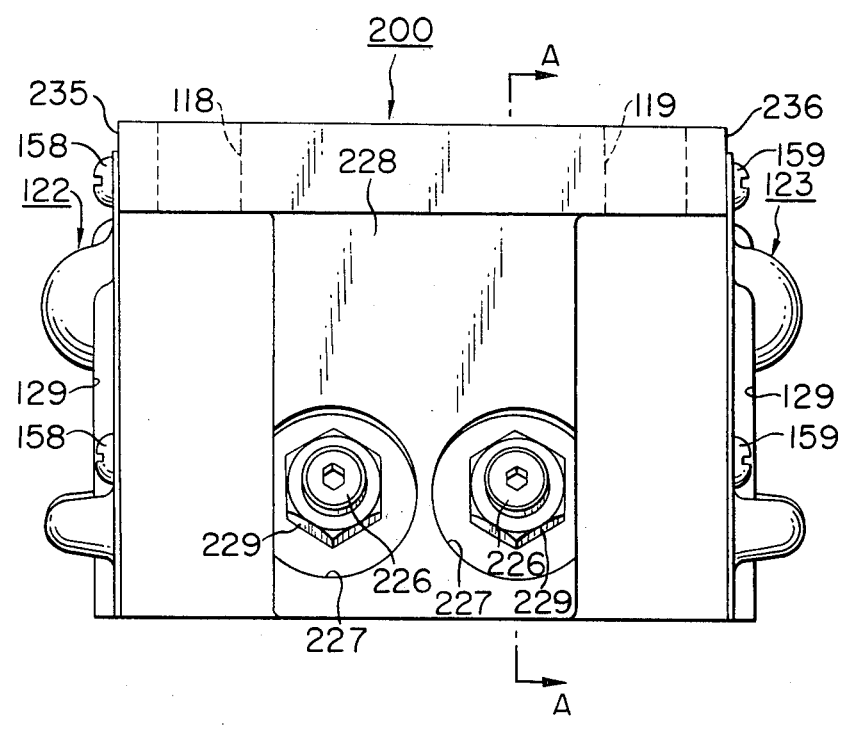
FIG. 11 is a side view of a linear bearing unit with an outer sleeve incorporated therein.
Figure 12:
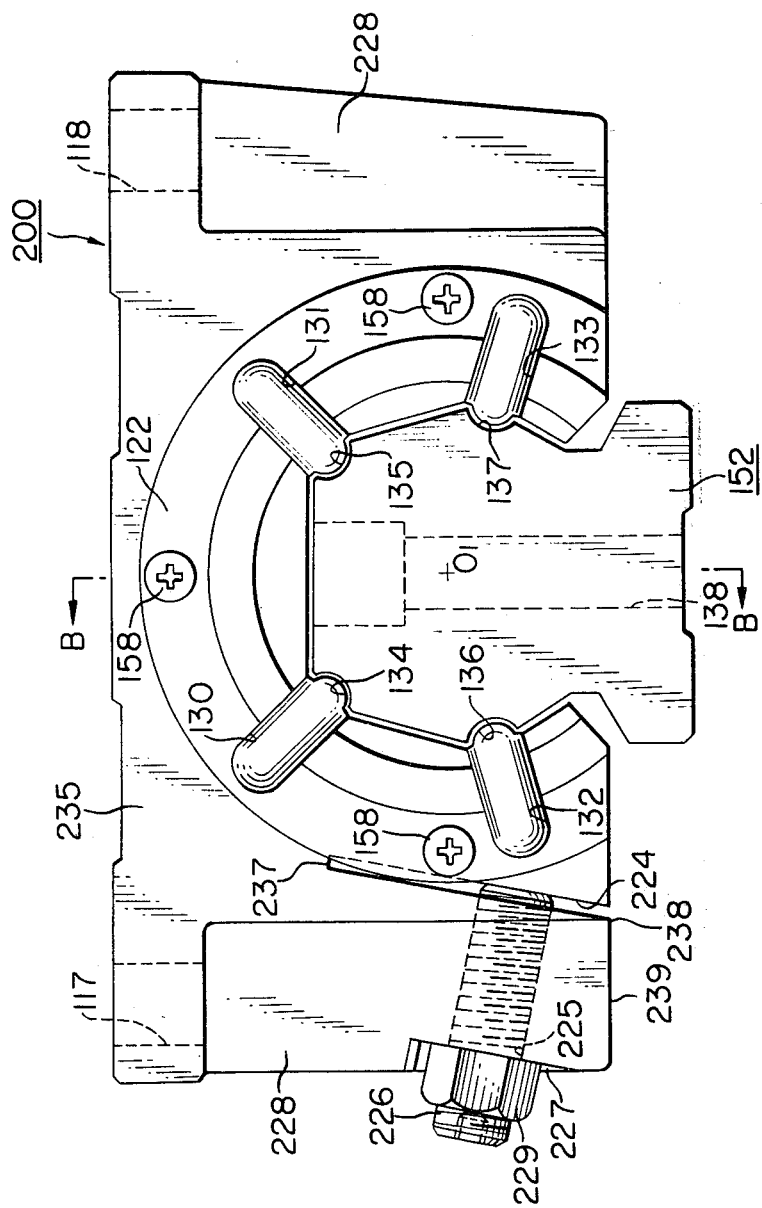
FIG. 12 is a front view of the linear bearing unit in FIG. 11.
Figure 13:
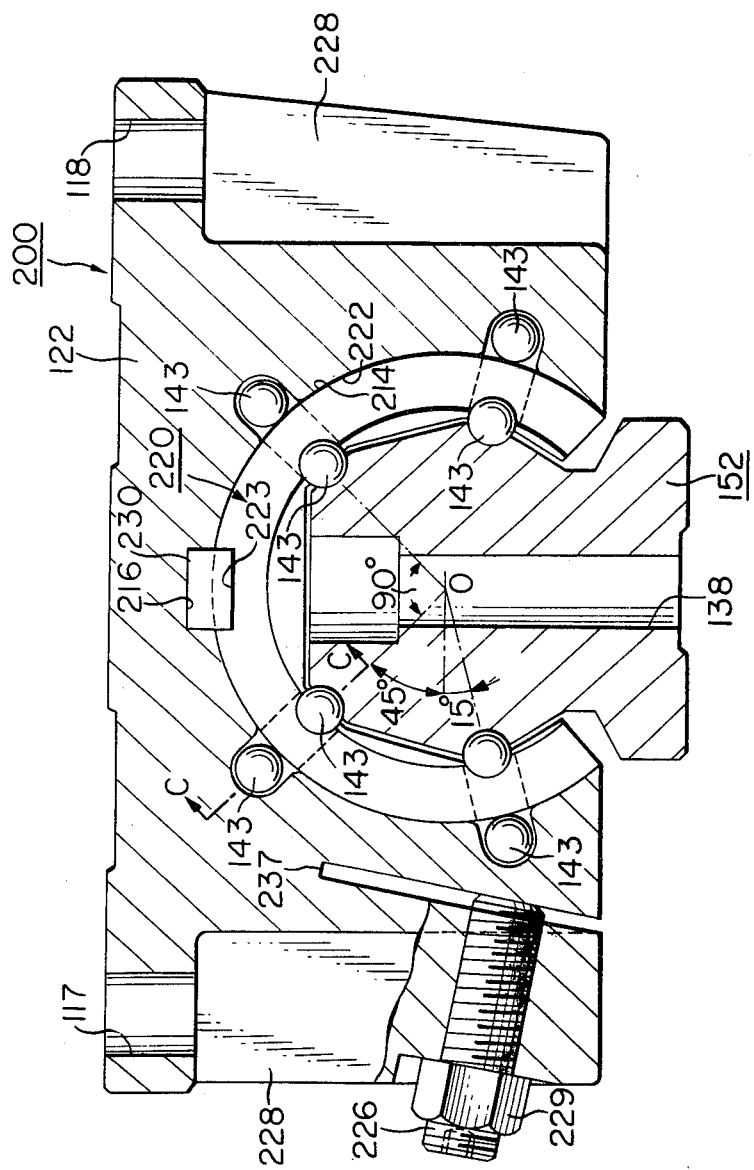
FIG. 13 is a cross-sectional view of the linear bearing unit taken in line B—B in FIG. 12.
Figure 14:
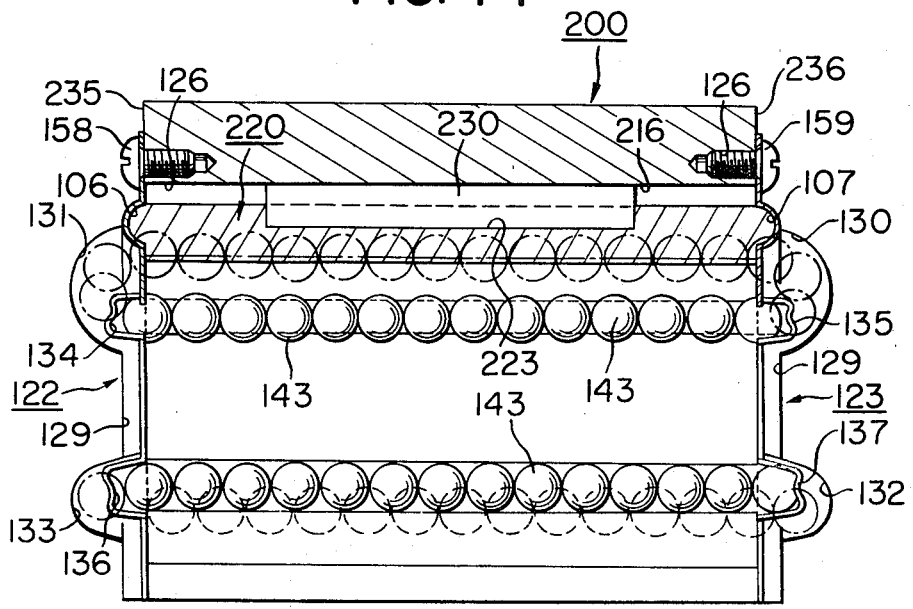
FIG. 14 is a partial sectional view of the linear bearing unit taken in line C—C in FIG. 13, shown in an enlarged scale.
Figure 15:
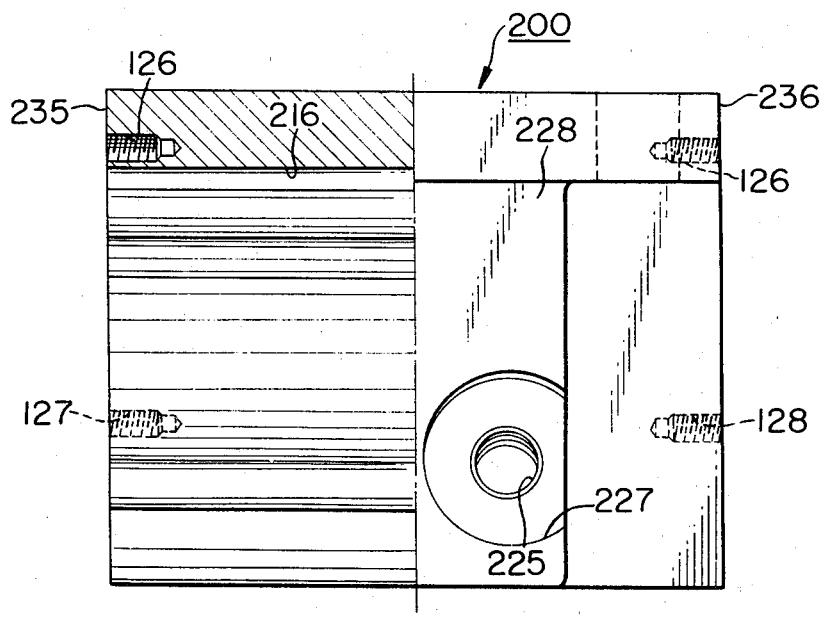
FIG. 15 is a partially sectioned side view of a bearing case for the linear bearing unit with an outer sleeve incorporated therein.

Next, reference numerals 122 and 123 in FIGS. 6 and 9 designate a side cover made of steel plate which is adapted to be firmly mounted on the front and rear end faces 120 and 121 of the bearing case 100. Said side covers 122 and 123 have an annular groove 129 and a plurality of U-shaped concave portions 130 to 133 respectively, wherein said annular groove 129 has a configuration corresponding to the annular projections 106 and 107, while said U-shaped concave portions 130 to 133 form a passage through which the direction of movement of balls from the loading ball track grooves 102 to 105 to the non-loading ball holes 109 to 112 is reversed.

Figure 4:
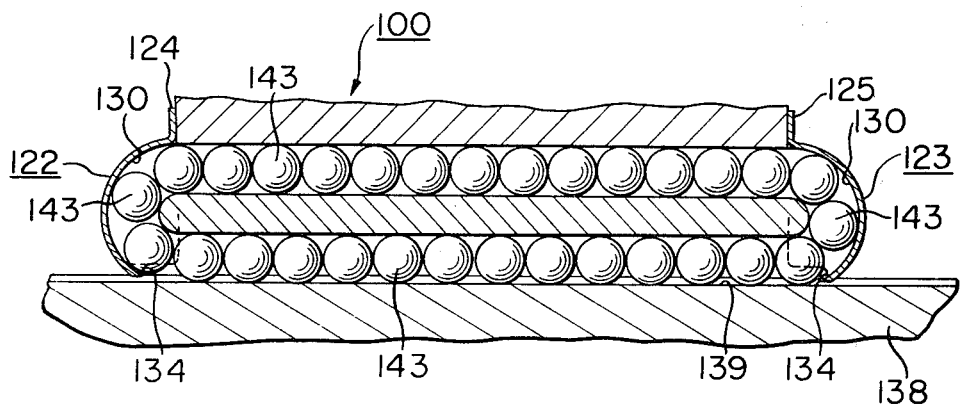
FIG. 4 is an enlarged sectional view of the linear bearing unit taken in line B—B in FIG. 3

Further, reference numerals 134 to 137 in FIGS. 2 and 4 designate a semi-circular ball guide tongue piece on side covers 122 and 123 respectively. Said ball guide tongue pieces 134 to 137 are located at the innermost end of the U-shaped concave portions 130 to 133 and serve for guiding balls 143 from the straight movement on the track grooves 102 to 105 of the bearing case 100 as well as on the track grooves 139 to 142 of the track table 138 to the rotary movement through the U-shaped concave portions 130 to 133.

The side covers 122 and 123 have mounting holes 145 to 147 drilled at the predetermined positions on the flat portions 124 and 125 thereof.

Figure 5:
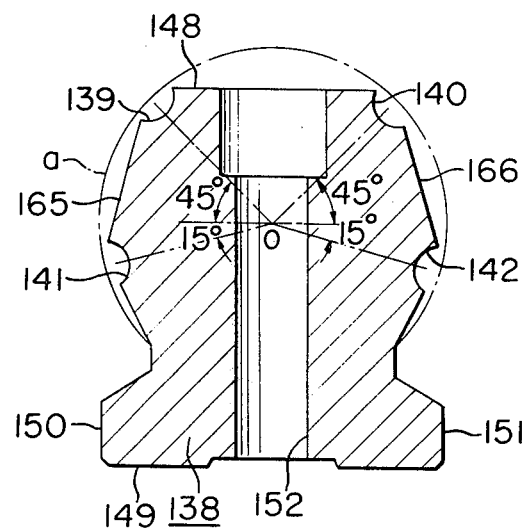
FIG. 5 is a cross-sectional view of a track table for the linear bearing unit.

As illustrated in FIG. 5, the track table 138 having the plural track grooves 139 to 142 formed thereon is made of square section steel by milling operation or the like such that its center line is aligned with the center 0 of the bearing case 100.

After completion of centering machining of the steel block upper and lower parallel surfaces 148 and 149 as well as both side parallel surfaces 150 and 151 are formed so that they serve as reference planes for machining track table 138. The upper track grooves 139 and 140 are provided on lines which extend through the center 0 of the track table 138 at an inclination angle of 45 degrees relative to the horizontal line X-X', whereas the lower track grooves 141 and 142 are provided on lines which extends at an inclination angle of 15 degrees relative to the horizontal line X-X' in a symmetrical relation. It is to be noted that the concave track grooves 139 to 142 have the substantially same radius of curvature as the outer diameter of the balls, wherein the center of the radius is located at an intersection of a pitch circle a having the predetermined radius r with the above-described inclined lines for the respective track grooves 139 to 142.

Reference numerals 165 and 166 in FIG. 5 designates an inclined surface formed between the upper track grooves 139 and 141 and the lower track grooves 140 and 142, while reference numeral 152 does a mounting hole. Further, reference numerals in FIG. 9 designate inner sides of the side covers 122 and 123.

Reference numerals 158 and 159 designate a tightening screw for firmly mounting the side covers 122 and 123 at the end faces of the bearing case 100.

Reference numeral 160 in FIG. 2 designates a threaded hole which extends at a right angle relative to the slit 114. Said threaded hole 160 is adapted to receive the hexagonal headed bolt 161 by screw movement.

The parts and components constituting the linear bearing unit in accordance with the present invention are provided in the above-described manner. Now they are assembled by way of the steps as mentioned below.

First, the side cover 122 is firmly secured to the one end face 120 of the bearing case 100 by means of the set screw 158. Then, a predetermined length of track table 138 is longitudinally fitted into the bearing casing 100 and thereafter the balls 143 are inserted from the other end face 121 through the non-loading ball holes 109 to 112 as well as through the longitudinal space between the track grooves 102 to 105 of the bearing case 100 and the track grooves 139 to 142 of the track table 138 one after another. Finally, the other side cover 123 is firmly fixed by means of the screws 159.

Next, operation of the linear bearing unit will be described below.

A linear bearing unit in accordance with the present invention is assembled to a certain machine (not shown) and then a predetermined device is fastened to the linear bearing unit. As the bearing case 100 moves forwards together with said predetermined device, the loading balls 143 held in the space between the concave track grooves 139 to 142 of the track table 138 and the concave track grooves 102 to 105 of the bearing case 100 roll forwards together with the bearing case 100. Then the balls 143 are scooped up by means of the ball guide tongue pieces 134 to 137 of the side covers 122 and 123 and thereby they are squeezed into the U-shaped concave portions 130 to 133, whereby they are delivered through the non-loading ball holes 109 to 112.

Since the contact points of the upper loading balls 143 against the bearing case 100 and the track table 138 are located on lines which extend upwards at an inclination angle of 45 degrees relative to the axis center 0 and those of the lower loading balls 143 are located on lines which extend downwards at an inclination angle of 15 degrees relative to the axis center 0 and moreover no retainer is held therebetween whereby the track grooves can be designed in the configuration which has a depth substantially equivalent to that of a semi-circle, it is ensured that the balls have an increased contact area which allows the linear bearing unit to have an improved load carrying capability. Namely, the linear bearing unit can be designed at an increased upward load as well as an increased lateral load. Further, since the track grooves have an increased depth, it is ensured that the linear bearing unit can carry a very high load in the opposite direction (upward load).

Furthermore, since the loading balls are subjected to prestress (preload) by screwing the hexagonal headed bolt while they are held in the four track grooves with the wide contact angle maintained, as illustrated in FIGS. 1 and 2, it is ensured that the linear bearing unit has a long working life as well as an increased rigidity.

Reference numerals 235 and 236 designate front and rear end faces of a bearing case 200.

Now the second embodiment of the present invention will be described with reference to FIGS. 11 to 17. In this embodiment a track table is designated by reference numeral 152 and a mounting hole is designated by reference numeral 138. Other parts and components similar or same to those in the foregoing embodiment are given the same reference numerals as those in the first embodiment.

Figure 16:
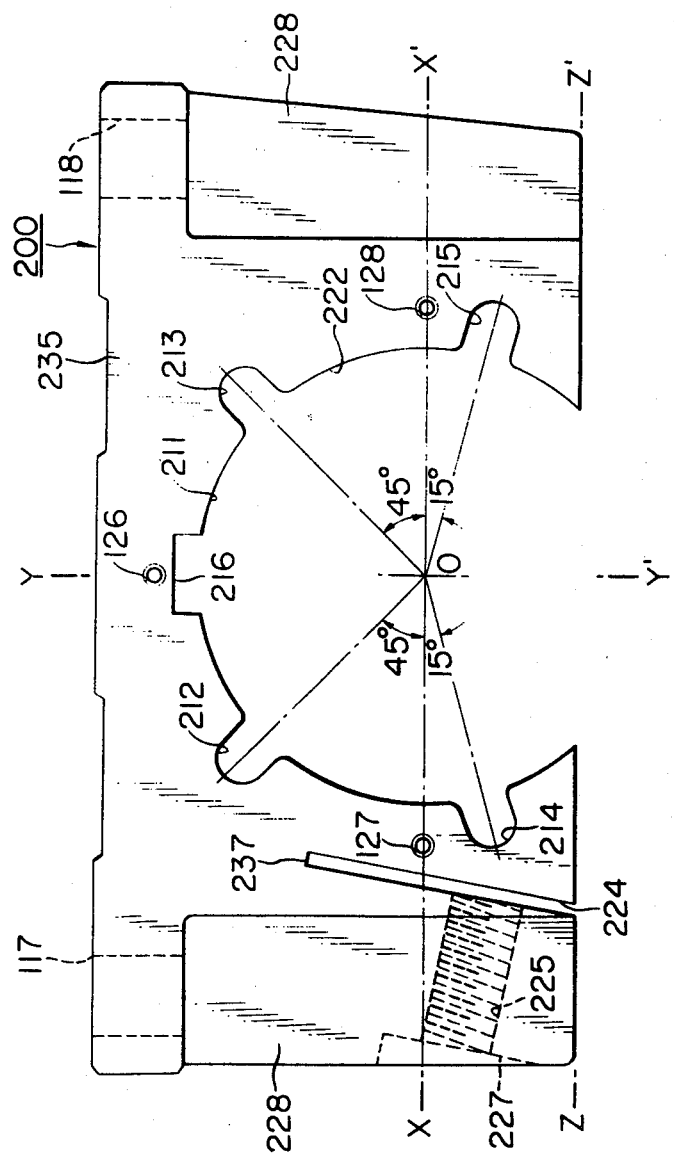
FIG. 16 is a front view of the bearing case in FIG. 15.

As illustrated in FIG. 16, the bearing case 200 made of rectangular section steel contains a longitudinally extending cylindrical inner recess 211 and four non-loading ball grooves 212 to 215 which radially extend from said inner recess 211, said non-loading ball grooves 212 to 215 having a substantially same width as the outer diameter of the balls in the U-shaped cross-sectional configuration.

It is preferable that the four non-loading ball grooves 212 to 215 are simultaneously machined, for instance, with the aid of a broaching machine.

Among the four non-loading ball grooves 212 to 215 the upper non-loading ball grooves 212 and 213 are provided such that non-loading balls are arranged at a position where a line extends radially which has an inclination angle of 45 degrees relative to the horizontal line X–X' passing through the center 0 of the bearing case 200, whereas the lower non-loading ball grooves 214 and 215 are provided such that the non-loading balls are arranged at a position where a line extends radially which has an inclination angle of 15 degrees relative to the horizontal line X–X' in a symmetrical relation.

Reference numeral 216 designates a key groove which longitudinally extends at middle part between the upper non-loading ball grooves 212 and 213.

Figure 17A:
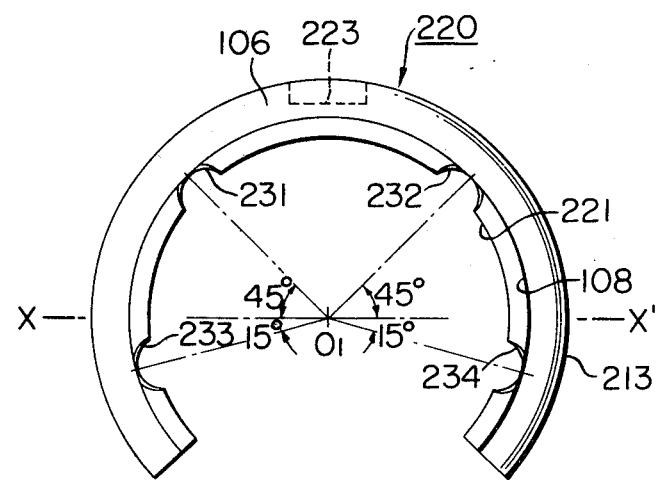
FIG. 17(A) is a front view of the outer sleeve.
Figure 17B:
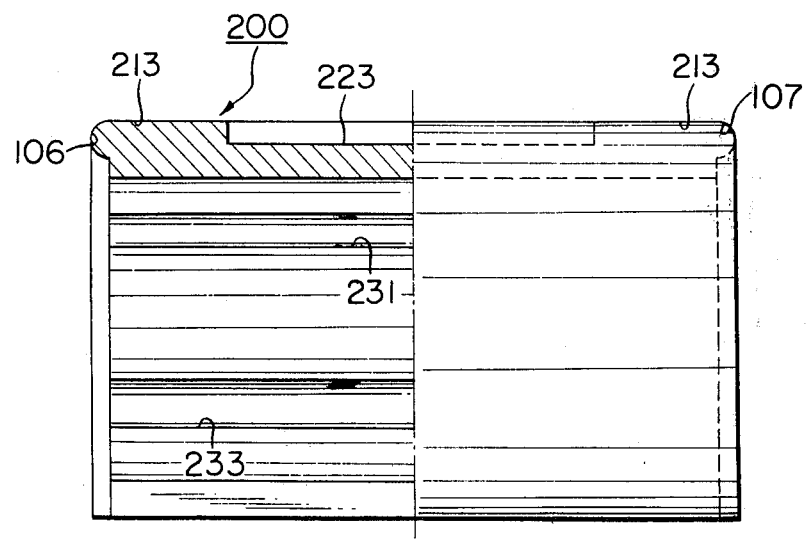
FIG. 17(B) is a partially sectioned side view of the outer sleeve.

Reference numerals 231 to 234 in FIG. 17 designate a longitudinally extending semi-circular loading ball track groove on the inner surface 221 of an outer sleeve 220. Said loading ball track grooves 231 to 234 has the substantially same radius of curvature as the diameter of the balls, wherein the upper track grooves 231 and 232 are located on a line which extends radially through the center 0 of the outer sleeve 220 at an inclination angle of 45 degrees relative to the horizontal line X–X', while the lower track grooves 233 and 234 are located on a line which extends radially through the center 0 at an inclination angle of 15 degrees relative to the horizontal line X–X' in a symmetrical relation.

Reference numerals 106 and 107 designate an annular projection provided at both end faces of the outer sleeve 220, which serves for guiding the return movement of the balls. The outer edge 213 of said annular projections 106 and 107 is located exactly at the inner edge 222 of the bearing case 200.

Reference numeral 223 designates a key groove formed on the periphery of the outer sleeve 220.

Reference numeral 224 in FIG. 16 designate a longitudinally extending deep slit machined in the body of the bearing case 200. A threaded hole 225 is provided at a right angle to said slit 224 so that a hexagonal headed bolt 226 is screwed therein.

Reference numeral 227 designates a recessed seat, while reference numeral 228 does a reinforcement rib for the bearing case.

Further, reference numeral 229 designates a lock nut which screws on the tightening bolt 226 so as to prevent it from being loosened. Reference numeral 230 designates a plain key.

Assembly of the linear bearing unit in accordance with the second embodiment as described above is effected by way of the following steps.

First, the side cover 122 is firmly secured to the one end face 120 of the bearing case 200 by means of set screws 158. Then, the outer sleeve 220 with the key 230 sunk thereon is fitted into the inner recess 211 of the bearing case 200 and thereafter a predetermined length of track table 152 is inserted through the outer sleeve 220.

Then, the balls 143 are inserted from the other end face 121 into the longitudinally extending hollow space in the non-loading ball grooves 212 to 215 as well as between the track grooves 231 to 234 of the outer sleeve 220 and the track grooves 139 to 142 of the track table 152 one after another and thereafter the side cover 123 is firmly secured to the end face 121 using set screws 159.

As is readily understood from the above description, the linear bearing unit assembled in the above-mentioned manner is characterized in that loading ball track grooves are formed on the inner wall of the outer sleeve, although they are provided directly in the bearing case in the foregoing embodiment.

Thus, it is very easy for the linear bearing unit to have non-loading ball grooves machined from the inner wall of the bearing case in the radial direction by broaching operation or the like.

The slit 228 is machined in parallel to the recessed seat 227 on the reinforcement rib 228 of the bearing case 200, wherein its upper end is located midst the upper and lower non-loading ball grooves 212 and 214, while its lower end 238 is opened at the bottom wall of the bearing case 200.

When screwing the hexagonal headed bolt 226 forwards, the right part of the bearing case relative to the slit 224 is deformed to the right, whereby the loading ball track grooves are prestressed or preloaded.

As will be obvious from the above description, the linear bearing unit in accordance with the present invention has advantages that it is constructed by less number of parts or components at a reduced manufacturing cost because of no retainer required and that a variety of linear bearing units ranging from large to small loading capacity can be manufactured without difficulty, because the length of the track face (same to the track groove) of the linear bearing unit can be adjusted merely by changing the length of the bearing body.

The track table is usually manufactured by way of the steps of machining the parallel surface at the upper and lower parts as well as both sides thereof and then forming the four track grooves.

What is claimed is:

1. A linear bearing unit essentially comprising a bearing case having a lower open end and four non-loading ball holes having the substantially same inner diameter as the ball diameter, side covers firmly secured to both end faces of said bearing case, a track table inserted through a cylindrical inner recess of the bearing case and a number of balls arranged in line one after another through four longitudinally extending circular hollow space between semi-circular concave track grooves on the cylindrical inner recess of the bearing case and another corresponding concave track grooves on the track table as well as through the four non-loading ball holes in the bearing case, said longitudinally extending circular hollow spaces being in communication with the non-loading ball holes via U-shaped concave portions formed on both the side covers, wherein the bearing case has annular projections at both the end faces thereof which are located between the non-loading ball holes and the concave track grooves on the cylindrical inner recess and further it has a longitudinally extending deep slit at one side thereof so as to prestress or preload some of the concave track grooves on the cylindrical inner recess, while the side covers contain annular grooves corresponding to said annular projection, U-shaped concave portions and ball guide tongue portions in communication with the longitudinally extending circular hollow space at the innermost end of said U-shaped concave portions.

2. A linear bearing unit as defined in claim 1, wherein said longitudinally extending deep slit is provided midst the outer non-loading ball hole and the inner loading ball track groove.

3. A linear bearing unit as defined in claim 1, wherein a threaded hole extends from the one end of the bearing case and is opened at the longitudinally extending deep slit.

4. A linear bearing unit as defined in claim 1, wherein the upper loading ball track grooves are located at a position where a line extends radially through the center of the bearing case at an inclination angle of 45 degrees relative to the horizontal line passing through said center in symmetrical relation.

5. A linear bearing unit as defined in claim 1, wherein the lower loading ball track grooves are located at a position where a line extends radially through the center of the bearing case at an inclination angle of 15 degrees relative to the horizontal line passing through said center in a symmetrical relation.

6. A linear bearing unit essentially comprising a bearing case having a lower open end, four non-loading ball grooves having the substantially same width as the ball diameter and a key groove located at the central part thereof, side covers firmly secured to both end faces of said bearing case, an outer sleeve having four loading ball track grooves on a cylindrical inner recess and a key groove on the outer surface thereof corresponding to said key groove in the bearing case, a track table inserted through the cylindrical inner recess of said outer sleeve, a key received in said key grooves and a number of balls arranged in line one after another through four longitudinally extending hollow spaces between semi-circular concave track grooves on the cylindrical inner recess of the outer sleeve and another semi-circular concave track grooves on the track table and through the four non-loading ball grooves on the inner wall of the bearing case, said longitudinally extending hollow space being in communication with said non-loading ball grooves via U-shaped concave portions formed on both the side covers, wherein the outer sleeve has annular projections at both the end faces thereof which are located midst the non-loading ball grooves and the concave track grooves on the cylindrical inner recess and further the bearing case has a longitudinally extending inclined deep slit at one side thereof so as to prestress or preload some of the concave track grooves on the cylindrical inner recess, while the side covers contain annular grooves corresponding to said annular projection, U-shaped concave portions and ball guide tongue portions in communication with the longitudinally extending hollow space at the innermost end of said U-shaped concave portions.

7. A linear bearing unit as defined in claim 6, wherein said longitudinally extending inclined deep slit is provided outside one of the non-loading ball grooves at a certain inclination.

8. A linear bearing unit as defined in claim 6, wherein a threaded hole extends at a right angle relative to a recessed seat at the one end of the bearing case and is opened at the longitudinally extending inclined deep slit.

* * * * *